(12) United States Patent
Tango

(10) Patent No.: US 7,223,458 B2
(45) Date of Patent: May 29, 2007

(54) MOLDED PRODUCT INCLUDING COUPLING COMPONENT INCORPORATED IN RECEIVING MEMBER

(75) Inventor: Ken-ichiro Tango, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 66 days.

(21) Appl. No.: 11/092,183

(22) Filed: Mar. 29, 2005

(65) Prior Publication Data

US 2005/0170140 A1 Aug. 4, 2005

Related U.S. Application Data

(63) Continuation of application No. PCT/JP03/04887, filed on Apr. 17, 2003.

(51) Int. Cl.
*B32B 3/24* (2006.01)
*F16B 9/00* (2006.01)

(52) U.S. Cl. .................. 428/131; 403/200; 411/81; 411/103; 411/108; 411/171; 411/104; 411/908; 411/258; 428/99; 301/64.701; 301/64.702; 301/64.703; 301/64.704

(58) Field of Classification Search ............. 428/131, 428/99; 411/258, 81, 103, 108, 171, 104, 411/908; 403/200; 301/64.702, 64.703, 301/64.704, 64.705, 64.701
See application file for complete search history.

(56) References Cited

U.S. PATENT DOCUMENTS 4,536,116 A * 8/1985 Murray ..................... 411/427
4,919,490 A * 4/1990 Hopkins et al. .......... 301/64.702
5,415,463 A * 5/1995 Olson et al. ............ 301/64.702
5,797,574 A * 8/1998 Brooks et al. .............. 248/398

FOREIGN PATENT DOCUMENTS

| JP | 55-135813 | 3/1954 |
| JP | 62-92309 | 1/1987 |
| JP | 4-132216 | 12/1992 |
| JP | 7-020759 | 1/1995 |
| JP | 7-098008 | 4/1995 |
| JP | 3042800 | 8/1997 |
| JP | 2001-227522 | 8/2001 |
| JP | 2001-289230 | 10/2001 |
| JP | 2002-364624 | 12/2002 |

* cited by examiner

Primary Examiner—William P. Watkins, III
(74) Attorney, Agent, or Firm—Greer, Burns & Crain, Ltd.

(57) ABSTRACT

A molded product includes a receiving member in a body. A coupling component such as a female screw component is embedded in the receiving member. A connecting piece is formed continuous to the body and the receiving member based on integral molding. The connecting piece extends to the receiving member from the body inside a bore formed in the body. The connecting piece may form a single flat plate in the molded product, so that a general cutting device can be utilized to cut through the connecting piece in a facilitated manner. The receiving member can be removed from the body without any difficulty. The receiving member can be separated from the body.

9 Claims, 5 Drawing Sheets

MOLDED PRODUCT INCLUDING COUPLING COMPONENT INCORPORATED IN RECEIVING MEMBER

This is a continuation of International Application No. PCT/JP2003/004887, filed Apr. 17, 2003.

BACKGROUND OF THE INVENTION

1. Field of the Invention

The present invention relates to a molded product comprising a body and a female screw component such as an insert nut embedded in the body.

2. Description of the Prior Art

Kinds of molded products are employed in a recording disk drive such as a magnetic tape library apparatus. The molded products are made of a synthetic resin material, for example. Female screw components such as insert nuts are embedded in the body of the molded product. The female screw components cooperate with male screws to attach predetermined members or components on the molded product. The female screw components are made of a metallic material such as steel, aluminum, brass, or the like.

The female screw components are placed in a die at predetermined positions in the process of making the molded product. A synthetic resin material is then injected into the die. The synthetic resin material thereafter gets solidified. The female screw components are thus embedded in the molded product. The female screw components cannot be removed from the molded product. It is very troublesome and time-consuming to separate the female screw components from the body of the molded product when one intends to throw out the molded product.

SUMMARY OF THE INVENTION

It is accordingly an object of the present invention to provide a molded product contributing to an easier separation of a female screw component from a body of the molded product.

According to a first aspect of the present invention, there is provided a molded product comprising: a body; a receiving member including a coupling component; and a connecting piece integral to the body and the receiving member based on integral molding, said connecting piece extending to the receiving member from the inside surface of a bore formed in the body.

The connecting piece may form a single flat plate in the molded product, so that a general cutting device can be utilized to cut through the connecting piece in a facilitated manner. The receiving member including the coupling component can be removed from the body without any difficulty. In general, the body, the receiving member and the connecting piece are made of a material different from that of the coupling component. The receiving member can be separated from the body.

The body, the receiving member and the connecting piece may be made of polyamide, for example. The coupling component may be made of a metallic material. The employment of the polyamide provides a higher rigidity of the molded product. Moreover, injection molding may be utilized to form the molded product.

The bore may penetrate through the body. An opening may defined between the receiving member and the body inside the bore. The tip end of a cutting device is allowed to enter the opening. The connecting piece can thus completely be divided.

The molded product may further comprise: a first rib formed to extend on the front surface of the body, said first rib connected to the connecting piece; and a second rib formed to extend on the back surface of the body, said second rib connected to the connecting piece. Even though an opening is defined between the body and the receiving member in the molded product, the receiving member can stably be fixed to the body with the assistance of the first and second ribs and the connecting piece. Even when a larger load is applied to the receiving member, the receiving member reliably maintains the connection to the body. The receiving member is allowed to reliably stay on the molded product even if a relatively heavy component or member is attached to the molded product. The thickness of the first and second ribs may be set equal to that of the body, for example.

According to a second aspect of the present invention, there is provided a molded product comprising: a body; a receiving member including a coupling component; and a protrusion standing from the surface of the body, said protrusion designed to connect the receiving member to the body based on integral molding.

The protrusion may form a single flat plate in the molded product, so that a general cutting device can be utilized to cut through the connecting piece in a facilitated manner. The receiving member including the coupling component can be removed from the body without any difficulty. In general, the body, the receiving member and the connecting piece are made of a material different from that of the coupling component. The receiving member can be separated from the body.

The molded product may further comprise a connecting piece continuous to the body and the receiving member based on integral molding, said connecting piece extending to the receiving member from the inside surface of a bore formed in the body. In this case, the protrusion and the connecting piece may form a single flat plate.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
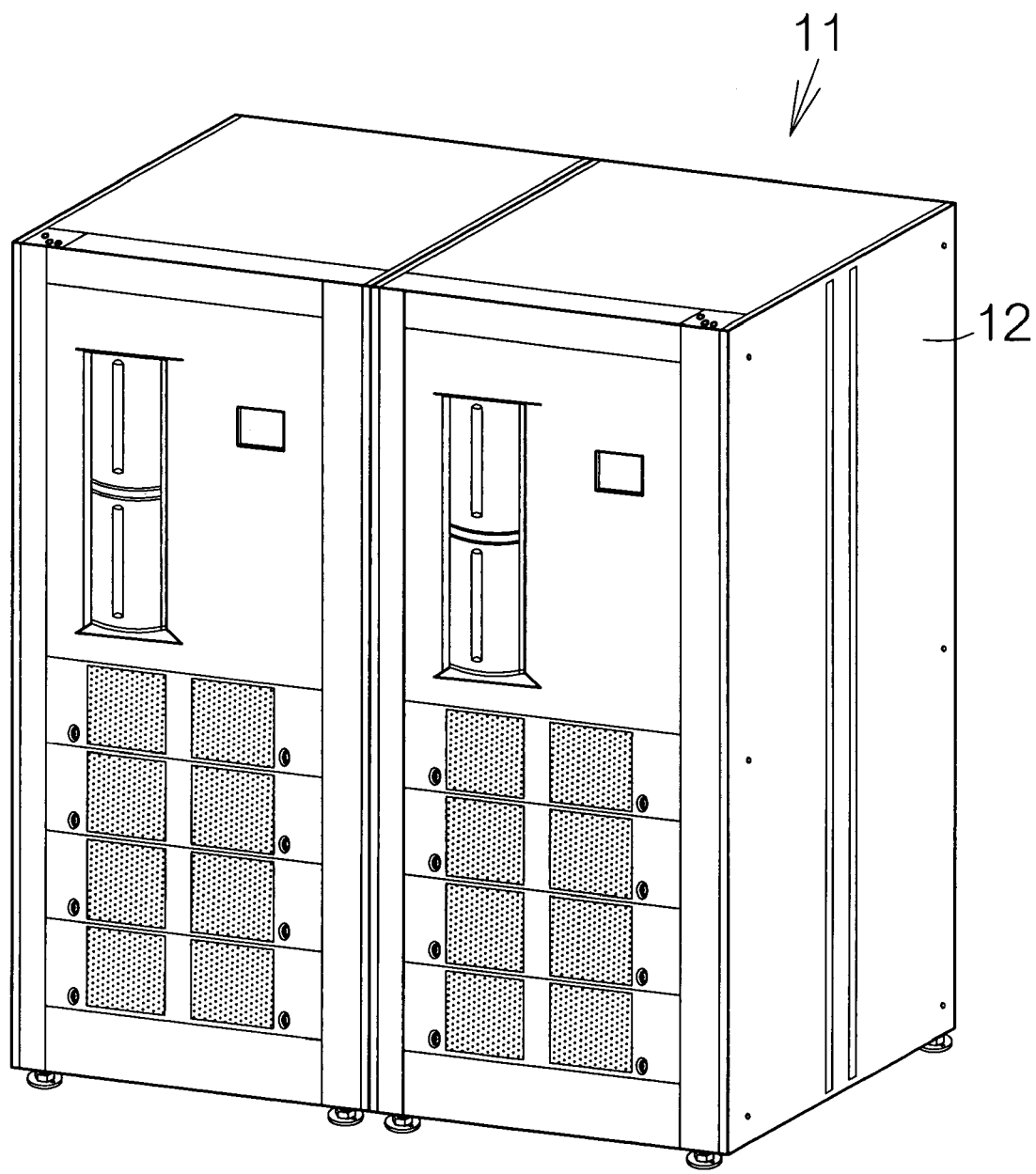
FIG. 1 is a perspective view illustrating a magnetic tape library apparatus as a specific example of a recording medium drive.
Figure 2:
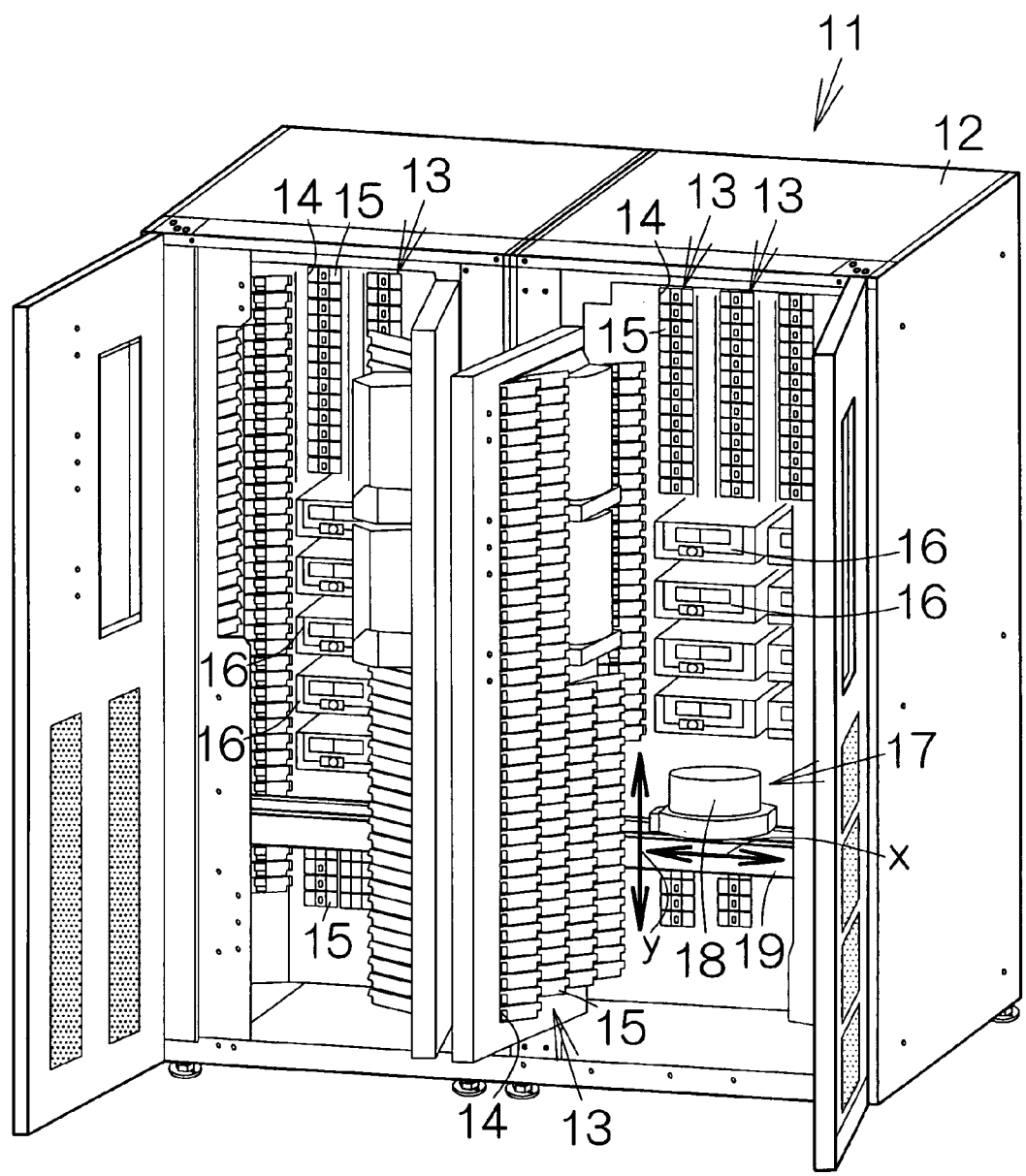
FIG. 2 is a perspective view illustrating the structure of the magnetic tape library apparatus.

FIG. 1 schematically illustrates a magnetic tape library apparatus 11 as a specific example of a recording medium drive. The magnetic tape library apparatus 11 includes a box-shaped enclosure 12 defining an inner space of a parallelepiped, for example. As shown in FIG. 2, storage cabinets 13 are incorporated in the inner space of the enclosure 12. Columns of cells 14 are incorporated in the individual storage cabinets 13, 13, . . . in the vertical direction of the magnetic tape library apparatus 11. Magnetic tape cartridges 15 are installed in the individual cells 14.

At least a magnetic tape drive 16 is incorporated within the inner space of the enclosure 12. The magnetic tape cartridge 15 is inserted into and withdrawn from the magnetic tape drive 16 through a slot. The magnetic tape in the magnetic tape cartridge 15 is unwound from the reel in the magnetic tape cartridge 15 and is wound to a reel in the magnetic tape drive 16.

A transport mechanism 17 is incorporated within the inner space of the enclosure 12. The transport mechanism 17 includes a picker 18 designed to carry any one of the magnetic tape cartridges 15. The picker 18 is capable of taking out the magnetic tape cartridge 15 from the magnetic tape drive 16 or the cell 14. The picker 18 is also allowed to insert the magnetic tape cartridge 15 into the magnetic tape drive 16 or the cell 14.

The transport mechanism 17 further includes a molded product or rail base 19 extending in the horizontal direction. The picker 18 is held on the rail base 19. The picker 18 is allowed to move in the horizontal direction along the rail base 19 in parallel with the x-axis established in the enclosure 12. An electric motor may be utilized to realize the horizontal movement of the picker 18 in the magnetic tape library apparatus 11, for example. The rail base 19 is allowed to move in the vertical direction in parallel with the y-axis perpendicular to the horizontal plane as described later. The horizontal attitude of the rail base 19 is maintained during the vertical movement. Combination of the horizontal and vertical movements allows the picker 18 to reach any one of the magnetic tape drives 16 and any one of the cells 14.

Figure 3:
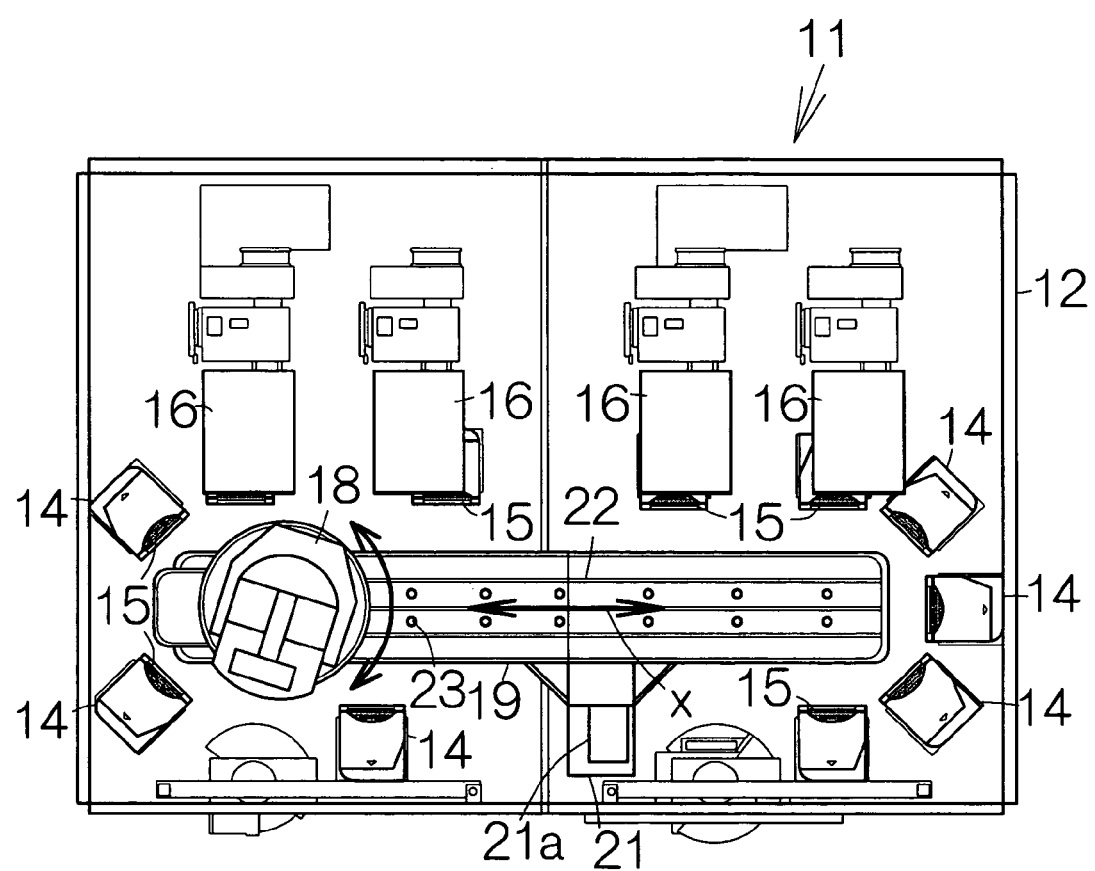
FIG. 3 is a plan view illustrating the structure of the magnetic tape library apparatus.

As shown in FIG. 3, a lift mechanism 21 is connected to the rail base 19. The lift mechanism 21 includes a guide rail 21a extending in the vertical direction in the magnetic tape library apparatus 11. The guide rail 21a serves to guide the vertical movement of the rail base 19. An electric motor may be incorporated in the lift mechanism 21 for driving the rail base 19.

A metallic rail 22 is fixed to the rail base 19. The rail 22 serves to guide the horizontal movement of the picker 18. Bolts 23 are employed to fix the rail 22 to the rail base 19. The bolts 23 penetrate through the rail 22 so as to allow the tip ends to be engaged into the rail base 19.

The picker 18 is allowed to rotate on the rail 22 around a rotation axis in parallel with the y-axis. This rotation is utilized to control the direction of the picker 18. An electric motor may be incorporated in the picker 18 for the rotation of the picker 18, for example.

Assume that the magnetic tape cartridge 15 is to be exchanged. The picker 18 is positioned in front of the target magnetic tape drive 16 based on the aforementioned horizontal and vertical movement. The direction of the picker 18 is also adjusted around the rotation axis in parallel with the y-axis. The picker 18 then takes out the magnetic tape cartridge 15 from the magnetic tape drive 16 through the slot. The picker 18 is thereafter positioned in front of the target cell 14 based on the horizontal and vertical movement. The direction of the picker 18 is also adjusted in the aforementioned manner. The picker 18 is finally allowed to insert the magnetic tape cartridge 15 into the cell 14.

The picker 18 is subsequently positioned in front of the next target cell 14 based on the horizontal and vertical movement. The direction of the picker 18 is also adjusted in the aforementioned manner. The picker 18 takes out the magnetic tape cartridge 15 from the cell 14. The picker 18 is this time positioned in front of the magnetic tape drive 16 based on the horizontal and vertical movement. The direction of the picker 18 is also adjusted in the aforementioned manner. The picker 18 acts to insert the magnetic tape cartridge 15 into the magnetic tape drive 16 through the slot.

Figure 4:
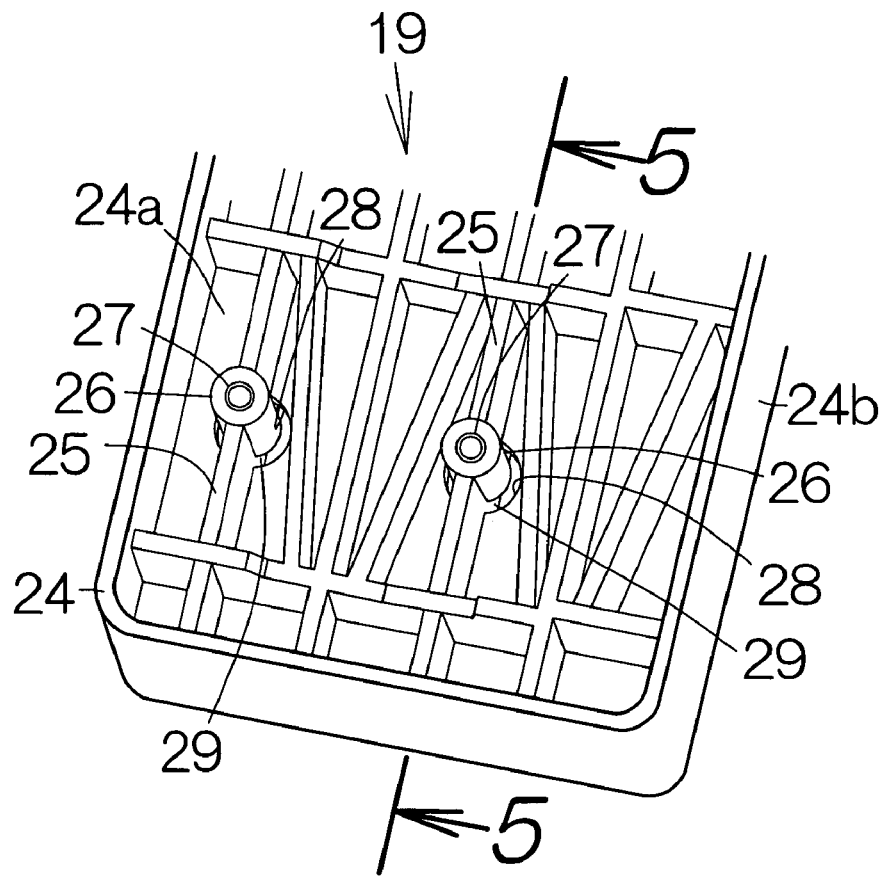
FIG. 4 is a perspective view illustrating the structure of a molded product according to a first embodiment of the present invention.

FIG. 4 schematically illustrates the structure of the rail base 19 as a molded product according to a first embodiment of the present invention. The rail base 19 includes a body 24. The body 24 has a bottom plate 24a. Peripheral wall 24b is formed on the bottom plate 24a. The peripheral wall 24b is designed to stand from the front and back surfaces of the bottom plate 24a along the periphery of the bottom plate 24a.

Protrusions or ribs 25 are formed on the rail base 19. The ribs 25 stand upright from the front and back surfaces of the bottom plate 24a. The ribs 25 are connected to the bottom plate 24a based on integral molding. The thickness of the ribs 25 is set equal to that of the bottom plate 24a and the peripheral wall 24b. It should be noted that the thickness of the ribs 25 may be set in view of the strength and/or size required for the ribs 25. In other words, the thickness of the ribs 25 may be set smaller or larger than that of the bottom plate 24a and the peripheral wall 24b.

Columnar receiving members 26 are embedded in the ribs 25. The receiving members 26 are connected to the ribs 25 based on integral molding. Female screw components or insert nuts 27 are incorporated within the receiving members 26, respectively. The insert nuts 27 may be made of a metallic material such as steel, aluminum, brass, or the like.

A bore 28 is formed in the bottom plate 24a underneath the receiving member 26. Here, the bore 28 penetrates through the bottom plate 24a. An opening is defined between the bottom plate 24a and the receiving member 26 inside the bore 28.

Connecting pieces 29 are formed in the bottom plate 24a. The connecting pieces 29 are designed to extend across the bore 28 in parallel with the rib 25. The connecting piece 29 connects the bottom plate 24a to the receiving member 26 inside the bore 28. The connecting piece 29 is continuous to the bottom plate 24a and the receiving member 26 based on integral molding. The body 24, the receiving members 26, the ribs 25 and the connecting pieces 29 may be made of a synthetic resin material such as polyamide, for example.

Figure 5:
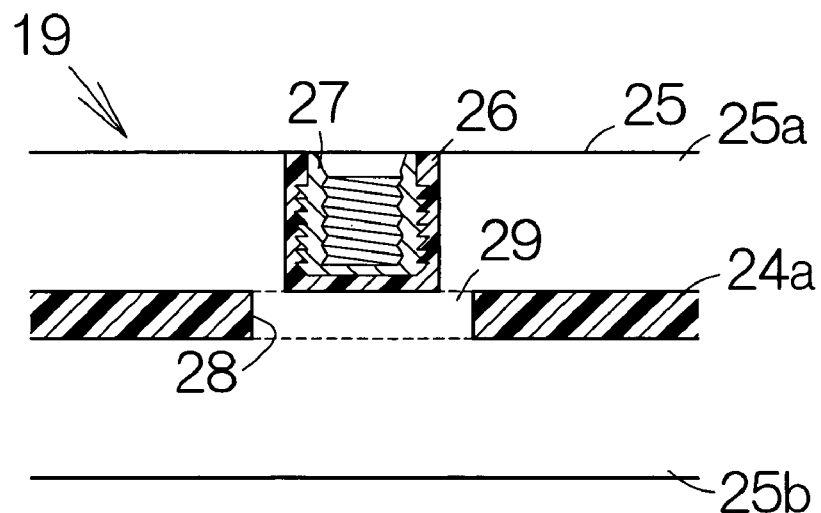
FIG. 5 is an enlarged partial vertical sectional view taken along the line 5—5 in FIG. 4.

As shown in FIG. 5, the rib 25 includes a first rib 25a formed on the front surface of the bottom plate 24a and a second rib 25b formed on the back surface of the bottom plate 24a. The connecting piece 29 serves to connect the first and second ribs 25a, 25b on the front and back surfaces of the bottom plate 24a to each other inside the bore 28. The first ribs 25a are connected to the receiving members 26 based on integral molding. The second ribs 25b are likewise connected to the receiving members 26 through the connecting pieces 29 based on integral molding.

The inner surface of the insert nut 27 is threaded. The bolt 23 is screwed into the insert nut 27. Tiny protrusions are formed on the outer surface of the insert nut 27 for preventing slippage. The tiny protrusions serve to prevent the insert nut 27 from slipping off from the receiving member 26.

Even though a gap is defined between the bottom plate 24a of the body 24 and the receiving member 26 in the rail base 19, the receiving member 26 can stably be fixed to the body 24 with the assistance of the ribs 25. Even when a larger load is applied to the receiving member 26 from the rail 22, the receiving member 26 reliably maintains the connection to the body 24. The receiving member 26 is allowed to reliably stay on the rail base 19 even during the horizontal movement of the relatively heavy picker 18 on the rail 22.

Now, assume that the rail base 19 is thrown out. The insert nuts 27 should be removed from the body 24. One may prepare a cutting device such as a nipper. The nipper is used to cut the first rib 25a at the front surface of the base plate 24a. The cutting line may be positioned adjacent the boundary between the receiving member 26 and the first rib 25a. Here, the tip end of the nipper is allowed to enter the opening. Accordingly, the first rib 25a can completely be divided. The receiving member 26 is in this manner completely separated from the first rib 25a. The connecting pieces 29 are also completely divided inside the bore 28. The connecting piece 29 is in this manner completely separated from the bottom plate 24a.

The nipper is subsequently used to cut the second ribs 25b at the back surface of the bottom plate 24a. The cutting line may be positioned between a region continuous to the separated connecting piece 29 and a region continuous to the bottom plate 24a in the second rib 25b. The tip end of the nipper is allowed to enter the opening in the aforementioned manner, so that the second rib 25b can completely be divided. The connecting pieces 29 and the receiving members 26 are thus completely separated from the second ribs 25b. The insert nut 27 is separated from the body 24.

The first rib 25a, the connecting piece 29 and the second rib 25b form a single flat plate in the rail base 19, so that a general cutting device can be utilized to cut through the first rib 25a, the connecting piece 29 and the second rib 25b in a facilitated manner. The receiving member 26 including the insert nut 27 can be removed from the body 24 without any difficulty. On the other hand, a conventional rail base employs a receiving member standing from the surface of the bottom plate of the body. The first rib and the bottom plate must continuously be cut through. Since the first rib extends perpendicularly to the bottom plate, one cannot continuously cut into the bottom plate with a general cutting device after the cutting of the first rib. The receiving member including the insert nut cannot be removed from the bottom plate.

The receiving member 26 may be located inside the bore 28 in the aforementioned rail base 19. For example, the receiving member 26 may be connected to the second rib 25b based on integral molding. In this case, an opening may be defined between the bottom plate 24a and the receiving member 26 inside the bore 28.

Injection molding may be utilized to form the rail base 19, for example. A die is first prepared. A cavity is defined in the die. The cavity is shaped into the shape of the rail base 19. The insert nuts 27 are placed within the cavity. Synthetic resin material fluid, such as polyamide fluid, is then injected into the cavity inside the die. When the synthetic resin material fluid is cooled, the synthetic resin material fluid gets solidified. The body 24, the receiving members 26, the ribs 25 and the connecting pieces 29 are thus formed based on integral molding. The insert nut 27 may tightly be inserted into the receiving member 26 after the rail base 19 has been molded.

Figure 6:
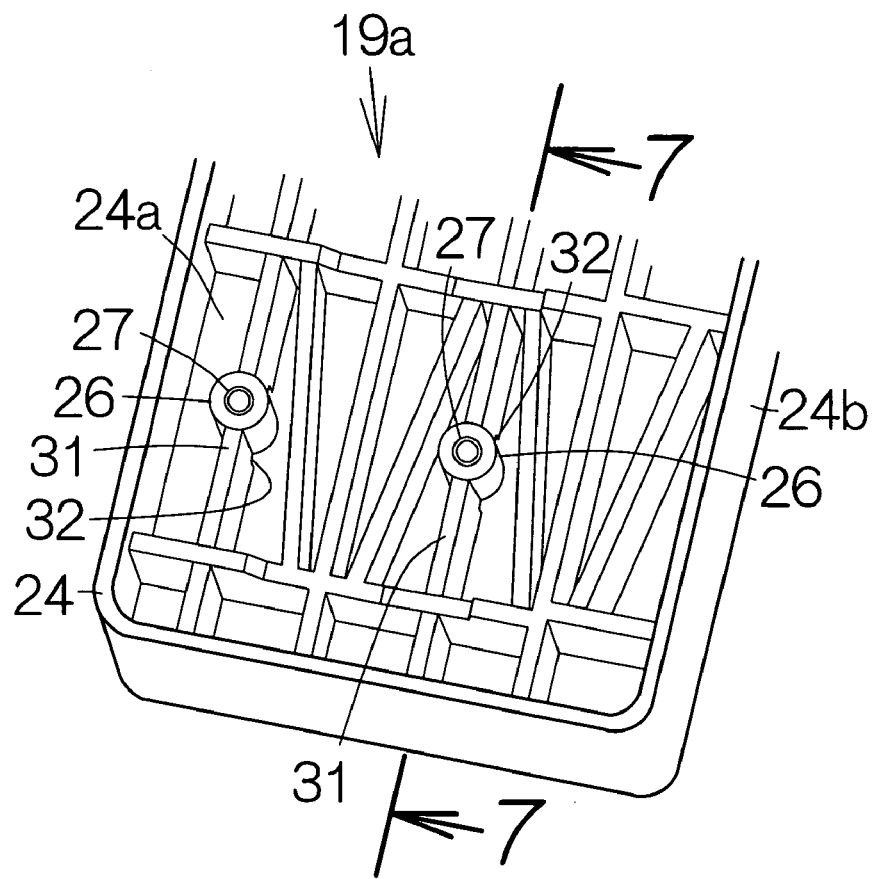
FIG. 6 is a perspective view illustrating the structure of a molded product according to a second embodiment of the present invention.

FIG. 6 schematically illustrates the structure of a rail base 19a according to a second embodiment of the present invention. The rail base 19a includes protrusions or ribs 31 standing from the surface of the bottom plate 24a. The ribs 31 are connected to the bottom plate 24a based on integral molding. Columnar receiving member 26 are embedded in the ribs 31. The receiving members 26 are connected to the ribs 31 based on integral molding. The body 24, the receiving members 26 and the ribs 31 may be made of a synthetic resin material such as polyamide in the same manner as described above. The thickness of the ribs 31 may be set equal to that of the bottom plate 24a and the peripheral wall 24b. Like reference numerals are attached to structures and components equivalent to those of the aforementioned first embodiment.

Figure 7:
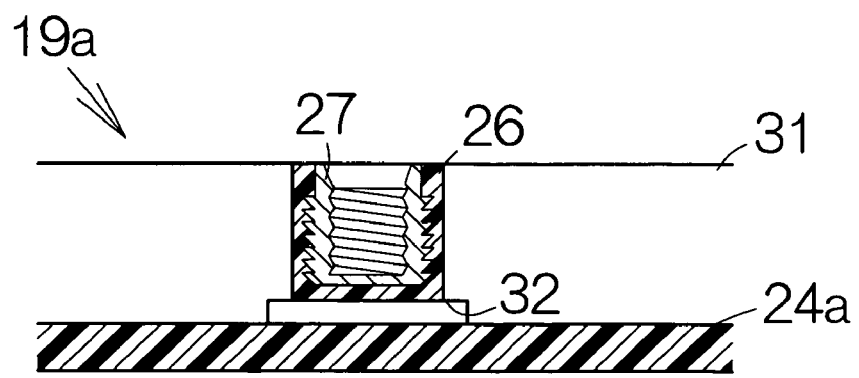
FIG. 7 is an enlarged partial vertical sectional view taken along the line 7—7 in FIG. 6.
Figure 7:
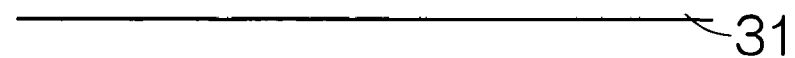

As shown in FIG. 7, a gap 32 is defined between the bottom of the receiving member 26 and the front surface of the bottom plate 24a. The gap 32 may extend into the rib 31. The ribs 31 may also be formed on the back surface of the bottom plate 24a in parallel with the ribs 31 on the front surface.

The ribs 31 serve to stably fix the receiving members 26 on the body 24 in the rail base 19a even though the gap 32 is defined between the bottom plate 24a of the body 24 and the receiving members 26. Even when a larger load is applied to the receiving member 26 from the rail 22, the receiving member 26 reliably maintains the connection to the body 24. The receiving member 26 is allowed to reliably stay on the rail base 19 even during the horizontal movement of the relatively heavy picker 18 on the rail 22.

Now, assume that the rail base 19a is thrown out. The insert nuts 27 should be removed from the body 24. One may prepare a cutting device such as a nipper. The nipper is used to cut the rib 31 at the front surface of the base plate 24a. The cutting line may be positioned adjacent the boundary between the receiving member 26 and the rib 31. The tip end of the nipper reaches the gap 32 extending into the rib 31. Accordingly, the rib 31 can completely be divided. The receiving member 26 is in this manner completely separated from the rib 31. The connecting piece 29 is in this manner completely separated from the bottom plate 24a. The insert nut 27 is separated from the body 24.

The rib 31 forms a single flat plate in the rail base 19a, so that a general cutting device can be utilized to cut through the rib 31 in a facilitated manner. The receiving member 26 including the insert nut 27 can be removed from the body 24 without any difficulty. Injection molding may likewise be utilized to form the rail base 19a in the aforementioned manner.

The size and shape of the bore 28 and the receiving member 26, as well as the thickness of the ribs 25, 31 maybe set depending on the strength required in the rail base 19, 19a. Any coupling component other than the aforementioned insert nut 27 may be embedded into the receiving member 26. The coupling component may establish a coupling in cooperation with one or more other component.

What is claimed is:

1. A molded product comprising:
    a body;
    a receiving member including a coupling component; and
    a connecting piece integral to the body and the receiving member based on integral molding, said connecting piece extending to the receiving member from the body inside a bore formed in the body; and
    a first rib formed to extend on a front surface of the body, said first rib connected to the connecting piece.

2. The molded product according to claim 1, wherein the body, the receiving member and the connecting piece are made of a material different from that of the coupling component.

3. The molded product according to claim 1, wherein said bore penetrates through the body.

4. The molded product according to claim 3, wherein an opening is defined between the receiving member and the body inside the bore.

5. The molded product according to claim 1, further comprising:
   a second rib formed to extend on a back surface of the body, said second rib connected to the connecting piece.

6. The molded product according to claim 5, wherein thickness of the first and second rib is set equal to that of the body.

7. The molded product according to claim 1, wherein the body, the receiving member and the connecting piece are made of polyamide.

8. The molded product according to claim 1, wherein the bore extends wider than a periphery of the receiving member.

9. The molded product according to claim 1, wherein the connecting piece extends across the bore so as to receive a bottom of the receiving member.

* * * * *